(12) United States Patent
Patel et al.

(10) Patent No.: US 7,281,657 B2
(45) Date of Patent: Oct. 16, 2007

(54) DEVICE FOR DIGITIZING AND PROCESSING CHECKS IN ACCORDANCE WITH THE CHECK 21 ACT AND FOR READING AND DECODING OPTICAL CODES

(75) Inventors: Mehul Patel, Fort Salonga, NY (US); Robert Sanders, St. James, NY (US); Christopher Warren Brock, Manorville, NY (US); Alan Quinn, Wading River, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 312 days.

(21) Appl. No.: 10/901,624

(22) Filed: Jul. 29, 2004

(65) Prior Publication Data

US 2006/0023930 A1    Feb. 2, 2006

(51) Int. Cl.
*G06K 7/10* (2006.01)
(52) U.S. Cl. ............... 235/454; 235/472.01; 235/383; 235/379
(58) Field of Classification Search ............ 235/454, 235/379, 383; 705/42
See application file for complete search history.

(56) References Cited

U.S. PATENT DOCUMENTS

| | | | |
|---|---|---|---|
| 2002/0195485 A1* | 12/2002 | Pomerleau et al. | 235/379 |
| 2003/0128866 A1* | 7/2003 | McNeal | 382/115 |
| 2003/0222135 A1* | 12/2003 | Stoutenburg et al. | 235/379 |
| 2005/0108163 A1* | 5/2005 | Wells et al. | 705/42 |

* cited by examiner

*Primary Examiner*—Michael G. Lee
*Assistant Examiner*—Kristy A. Haupt
(74) *Attorney, Agent, or Firm*—Carter, DeLuca, Farrell & Schmidt, LLP

(57) ABSTRACT

An integrated platform is provided for digitizing checks and other documents, including the processing of the digitized checks in accordance with Check 21 standards and requirements, and for reading and decoding optical codes. The integrated platform includes a document scanner or digitizer for digitizing checks and other documents, and a data capture device for imaging and scanning optical codes, and sensing RFID optical code signals. The processor executes application software for processing the digitized checks in accordance with Check 21 standards and requirements and for operating the data capture device.

44 Claims, 2 Drawing Sheets

DEVICE FOR DIGITIZING AND
PROCESSING CHECKS IN ACCORDANCE
WITH THE CHECK 21 ACT AND FOR
READING AND DECODING OPTICAL
CODES

BACKGROUND OF THE INVENTION

1. Field of the Invention

This invention relates to a device for performing multiple tasks. More particularly, the present invention relates to a device for digitizing documents and reading and decoding optical codes, such as bar codes, DPM codes and RFID codes. Even more particularly, the present invention relates to a device for digitizing and processing checks in accordance with the standards and requirements of the Check 21 Act and for reading and decoding optical codes.

2. Description of the Related Art

The Check 21 Act signed into law by the President of the United States in October 2003 establishes a legal basis for an electronic form of check. In the United States, after the law takes effect in October 2004, mandatory acceptance of the new digital check will be required. For example, banks and other financial institutions will be required to accept a digital image to clear checks, thereby making check processing, including check authentication, much faster and reducing check fraud.

In order to conform with the Check 21 Act, checks have to be digitized before being presented to be cleared via automated check clearing processing. Digitization can be performed by business establishments accepting checks by mail or at a point-of-sale, such as retail establishments, service providers (telephone companies, satellite television companies, etc.); education institutions; and banks of a first deposit, such as financial institutions who accept checks for deposit. As is known in the art, checks, like many documents, can be digitized using scanning or imaging devices operating on particular platforms and the resulting digital images being stored in databases.

Currently business establishments and financial institutions rely on these scanning devices operating on particular platforms to scan and digitize checks and other devices/systems operating on the same or different platforms to perform additional tasks. In order for the scanning devices and the other devices/systems to communicate and acknowledge each other, custom application software is generally required, including communication protocols and hardware. Custom application software is also required for performing Check 21 processing methodologies to process the digitized checks in accordance with Check 21 standards and requirement before presenting the digitized checks for clearing. This results in an increase in set-up, maintenance and operating costs.

A need therefore exists for an integrated platform enabling the digitization of checks and other documents, including the processing of checks in accordance with Check 21 standards and requirements, and the performance of additional tasks, such as reading and decoding optical codes, such as bar codes, DPM codes and RFID codes.

A need also exists for a device for digitizing and processing checks in accordance with Check 21 standards and requirements and for reading and decoding optical codes.

Additionally, a need exists for a device for digitizing checks, as well as processing the digitized checks in accordance with Check 21 standards and requirements, when operating in a first mode, and for imaging, laser scanning, sensing, reading and decoding optical codes when operating in a second mode.

SUMMARY OF THE INVENTION

It is an aspect of the present invention to provide an integrated platform enabling the digitization of checks and other documents, including the processing of checks in accordance with Check 21 standards and requirements, and the performance of additional tasks, such as reading and decoding optical codes, such as bar codes, DPM codes and RFID codes.

Another aspect of the present invention is to provide a device for digitizing and processing checks in accordance with Check 21 standards and requirements and for reading and decoding optical codes.

Another aspect of the present invention is to provide a device for digitizing checks, as well as processing the digitized checks in accordance with Check 21 standards and requirements, when operating in a first mode, and for imaging, scanning, sensing, reading and decoding optical codes when operating in a second mode.

In accordance with the above aspects, the present invention provides an integrated platform preferably configured as a single device. The device includes a processor for running an operating system for digitizing checks and other documents, including the processing of checks in accordance with Check 21 standards and requirements, when operating in a first mode, and for reading and decoding optical codes, such as bar codes, DPM codes and RFID codes, when operating in a second mode. An actuation mechanism, such as a trigger assembly, button, switch, and motion or other type of sensor, is included for actuating and/or switching the device between the first and second modes.

A document scanner or digitizer is included for digitizing checks. The processor executes Check 21 application software for processing the digitized checks in accordance with Check 21 standards and requirements. The processor also executes optical code application software for operating an optical code/RFID reader or data capture device.

The data capture device includes several data capture modules for capturing data, including data encoded within optical codes or optical code signals. The data capture modules preferably include an imaging module for imaging optical codes, a laser scanning module for scanning optical codes using a laser beam, and an RFID reading module for sensing RFID optical code signals transmitted from RFID tags. The modules generate optical code data which are transmitted to the processor for decoding as known in the art.

BRIEF DESCRIPTION OF THE DRAWINGS

Various embodiments of the invention will be described herein below with reference to the figures wherein.

DETAILED DESCRIPTION OF THE PREFERRED EMBODIMENTS

Figure 1:
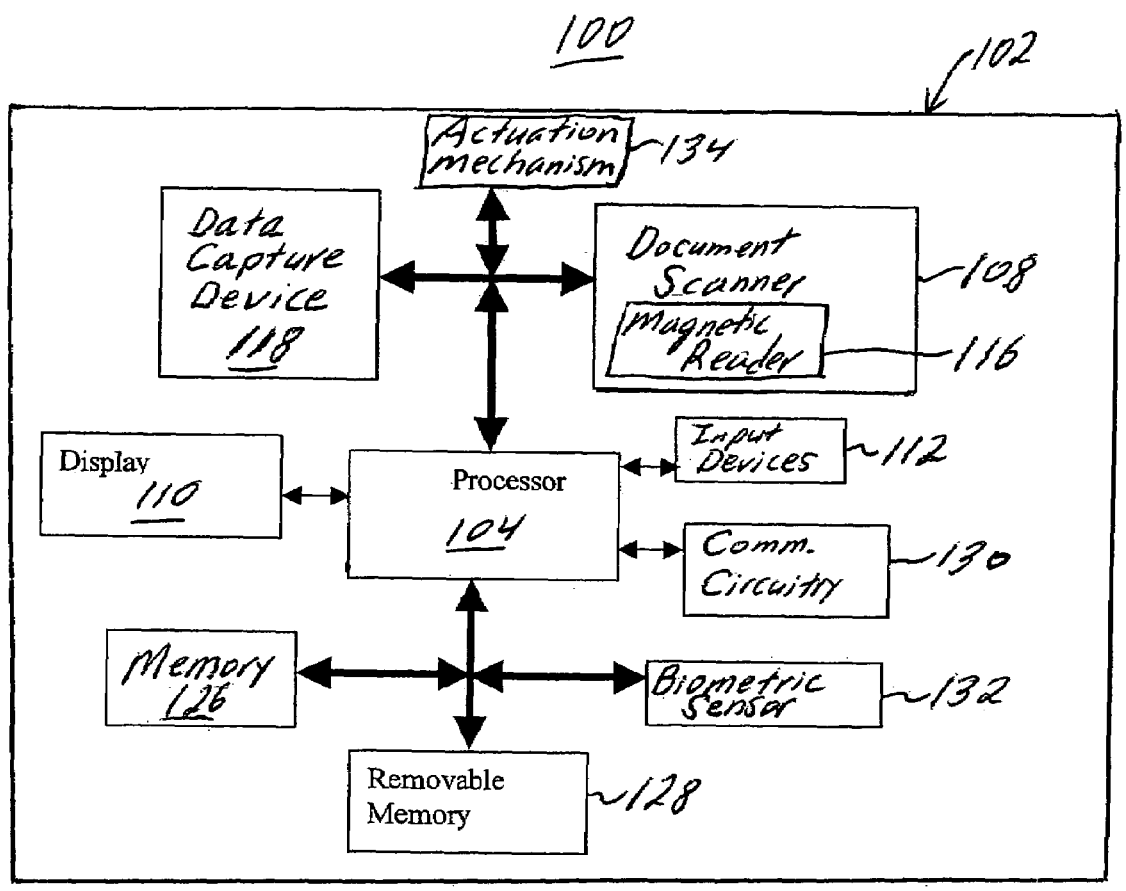
FIG. 1 is a block diagram of an integrated platform for digitizing and processing checks in accordance with Check 21 standards and requirements, and for reading and decoding optical codes in accordance with the present invention.
Figure 2:
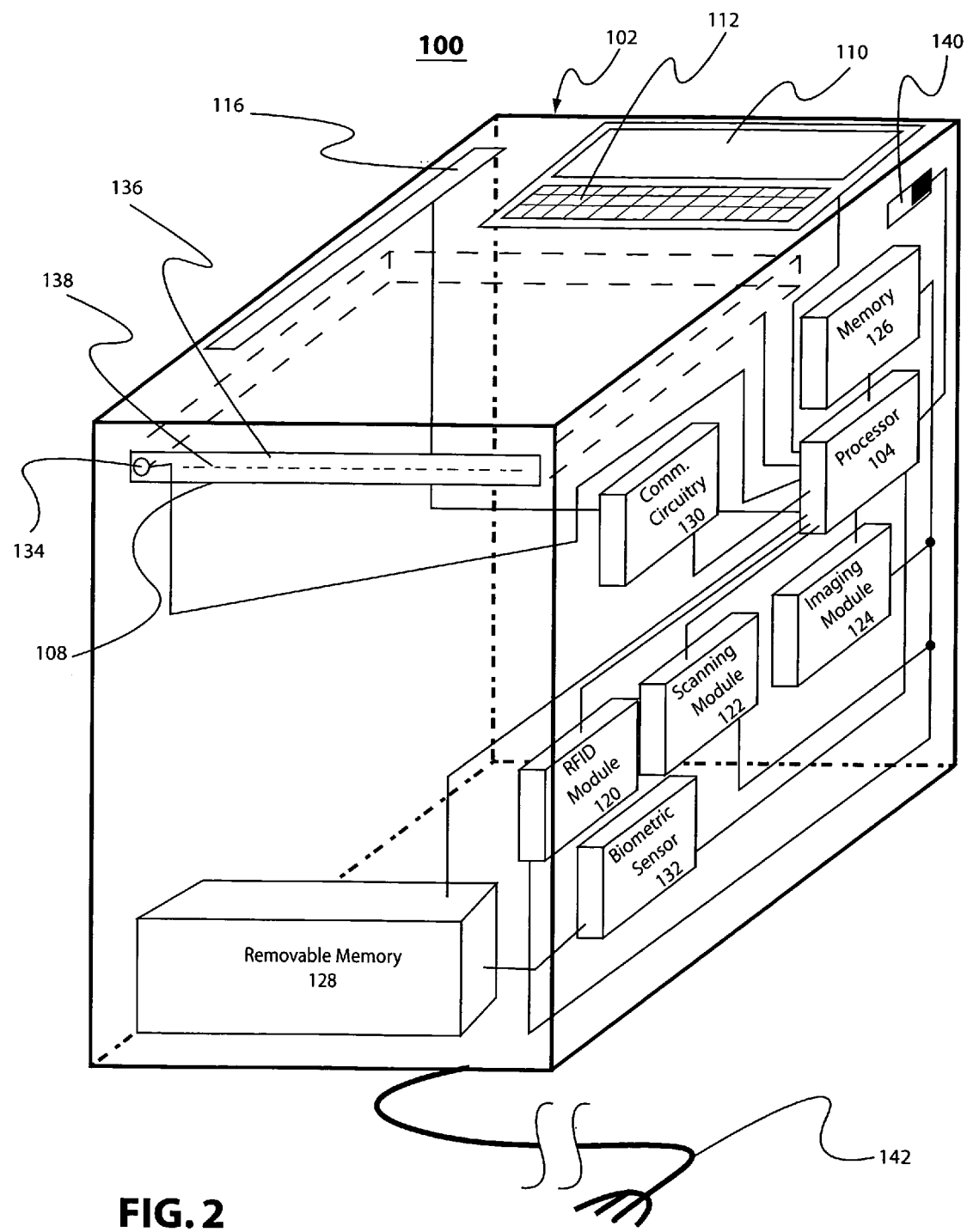
FIG. 2 is a schematic diagram of a device in accordance with the present invention.

With reference to FIG. 1, there is shown a block diagram and a schematic diagram, respectively, of an integrated platform for digitizing and processing checks, in accordance with Check 21 standards and requirements, when operating in a first mode, and for reading and decoding optical codes when operating in a second mode, in accordance with the present invention. The integrated platform designated generally by reference numeral 100 is preferably configured as a single device 100 as shown by FIG. 2.

The device 100 includes a processor 104 for running an operating system for digitizing checks and other documents, including the processing of checks in accordance with Check 21 standards and requirements, when operating in the first mode, and for reading and decoding optical codes, such as bar codes, DPM codes and RFID codes, when operating in the second mode. An actuation mechanism 106, such as a trigger assembly, button, switch, and motion or other type of sensor, is included for actuating and/or switching the integrated platform 100 between the first and second modes.

The device 100 includes a document scanner or digitizer 108 for digitizing checks and other documents. The document scanner 108 is preferably capable of simultaneously scanning the front and back sides of a check for creating a substitute check as required by the Check 21 Act.

In accordance with the Check 21 Act, substitute checks are the legal equivalent of the original checks so long as they accurately represent all of the information on the front and back of the original checks and bear the MICR (Magnetic Ink Character Recognition) line according to the precise standards set by the American National Standards Institute (ANSI). Further, in accordance with the Check 21 Act, substitute checks will bear the legend: "This is a legal copy of your check. You can use it the same way you would use the original check." The Check 21 Act further provides that "reconverting banks," that is those institutions that convert electronic images into paper substitute checks, must identify themselves on the substitute check.

Accordingly, the processor 104 executes Check 21 application software for operating the document scanner 108 and for processing the digitized checks, including authenticating the digitized checks, in accordance with check presentment procedures and regulations as well as Check 21 standards and requirements. The processor 104 upon executing the Check 21 application software determines the characters of the MICR line for each digitized check using image processing and parsing techniques as known in the art. The processor 104 then generates the MICR line.

The application software includes instructions for being executed by the processor 104 for providing the generated MICR line to the corresponding digitized check as an overlay and/or sidebar, such that each digitized check bears the proper MICR line in accordance with the requirements of the Check 21 Act after being digitized. The MICR line is subsequently used to clear the digitized checks, or other substitute checks derived from the digitized checks, using automated check clearing processing.

The processor 104 also upon executing the Check 21 application software provides the legend required for each check to bear by the Check 21 Act. The processor provides the legend: "This is a legal copy of your check. You can use it the same way you would use the original check," (or other legend conveying the same or similar message) to each digitized check in accordance with the requirements of the Check 21 Act. The legend can be provided as an overlay to the digitized check and/or as a sidebar to the digitized check. The Check 21 application software also identifies the names of the "reconverting banks," as required by the Check 21 Act, to each digitized check. The names of the "reconverting banks" can be identified via an overlay and/or sidebar for each digitized check.

The processor 104 can also execute application software for performing other functions related to the scanned and digitized documents, such as document storage and retrieval, database management, and parsing the digitized images.

After digitization, the digitized checks can be stored as one or more files within a memory 126 of the device and are viewable via a display 110. The display 110 can be a touch-screen display. The display 110 also displays information regarding a scanned item, such as a description of the scanned item and the corresponding price. Input devices 112, such as a standard alphanumeric keyboard and a track ball, can be used to input data to the device 100, such as the names of the "reconverting banks" and to perform other functions, such as manage data, and access a memory 114 for viewing digitized documents.

The device 100 further includes a magnetic reader 116 for reading magnetic stripes on checks for post-processing and/or post-authentication of checks by the processor 104. The magnetic reader 116 can also be used to swipe credit and debit cards for payment processing purposes as known in the art. The magnetic reader 116 can be part of the document scanner 108 as shown by FIG. 1. Accordingly, the device 100 is a complete point-of-sale terminal capable of performing checkout and payment processing procedures, as well as electronic check presentment procedures where the check is presented, digitized and the original check is given back to the check presenter.

When operating in the second mode, the processor 104 executes optical code application software for operating an optical code/RFID reader or data capture device 118. The data capture device 118 includes several data capture modules for capturing data, including data encoded within optical codes or optical code signals. The data capture modules preferably include an imaging module 120 for imaging optical codes, a laser scanning module 122 for scanning optical codes using a laser beam, and an RFID reading module 124 for sensing RFID optical code signals transmitted from RFID tags.

As is known in the art, the imaging module 120, laser scanning module 122 and RFID reading module 124 generate optical code data indicative of the optical code imaged, scanned or sensed. The optical code data is transmitted to the processor 104 for post-processing.

After receiving the optical code data, the processor 104 reads and decodes the optical code data by executing one or more decoding algorithms corresponding to a plurality of optical code symbologies as known in the art. The decoding algorithms are stored within the memory 126, such as FLASH, RAM, ROM, and EPROM, and/or within a removable memory 128, such as a hard drive, CD-ROM, and diskette.

The processor 104 generates a signal, such as an audible sound, if the optical code data are successfully read and decoded. If a misread occurs, the processor 104 generates a different signal. The processor 104 can operate the document scanner 108 and the data capture device 118 simultaneously for performing two or more functions at the same time using parallel processing methodologies. The processor 104 can also indicate a successful or non-successful decode operation via the display 110.

The device 100 further includes communication circuitry 130 for communicating with an external host processor or other processor. The communication circuitry 130 can include components for performing wireless and non-wireless communications for transmitting and receiving data, such as data related to the processed and authenticated checks, decoding algorithms, and receiving software updates, including receiving software updates for the processing of the digitized checks in accordance with Check 21 standards and requirements.

The processor 104 executes communication application software for operating the communication circuitry 130, including enabling the communication circuitry 130 to establish a network connection, such as an Internet connection, for transmitting and receiving data packets over a network, such as the Internet. The digitized checks stored in the memory 126 and/or removable memory 128 are transmitted by the communication circuitry 130 to an external processor or financial system to be cleared in accordance with Check 21 standards and requirements, and/or electronic check clearing procedures.

The device 100 further includes at least one biometric sensor 132 for authenticating the identity of an individual presenting a check to a user of the device 100 to be processed. The biometric sensor 132 scans, for example, the individual's eye, fingerprint and facial characteristics, and maps the scanned image to an image stored within the memory 126 or removable memory 128 or an external database accessible via the communication circuitry 130. Each of the stored images corresponds to a particular individual. Accordingly, if the scanned image corresponds to a stored image, the device 100 can successfully authenticate the individual's identity.

In order to switch between the first and second modes, the device 100 includes an actuation mechanism 134, such as a trigger assembly, button, switch, and motion or other type of sensor, for actuating and/or switching the device 126 to operate in the first or second mode. FIG. 2 illustrates the actuation mechanism 134 as an infrared sensor.

The infrared sensor determines whether a check is positioned within a check-receiving slot 136 of the document scanner 108. If a check is positioned within the check-receiving slot 136, an infrared light beam 138 emitted by the infrared sensor is intercepted and a signal is sent to the processor 104 for operating the device 100 in the first mode. If the infrared light beam 138 is not intercepted, the signal is not sent to the processor 104 and the device 100 operates in the second mode.

In an alternate embodiment, the device 100 is configured for operating in the first and second modes simultaneously in order to scan, image and digitize checks, including processing checks in accordance with Check 21 standards and requirements (or scan and read magnetic stripes), while imaging optical codes, scanning optical codes, and/or sensing RFID optical code signals.

The device 100 includes a power switch 140 and an electrical cord 142 for plugging the device to a power source or electrical outlet. The device 100 can also be configured for being operated by a battery.

Another actuation mechanism can also be provided for determining whether a credit or debit card is being swiped using the magnetic reader 116. If a credit or debit card is being swiped, the actuation mechanism prevents the device 100 from being operated in the first and second modes.

The described embodiments of the present invention are intended to be illustrative rather than restrictive, and are not intended to represent every embodiment of the present invention. Various modifications and variations can be made without departing from the spirit or scope of the invention as set forth in the following claims both literally and in equivalents recognized in law.

The invention claimed is:

1. A device for digitizing checks and decoding optical code data, said device comprising:
   a digitizer for digitizing said checks;
   at least one data capture module for generating data unrelated to said digitized checks, said data unrelated to said digitized checks comprising optical code related data, biometric related data, and RFID tag related data; and
   a processor capable of executing application software for operating said digitizer and said at least one data capture module, for processing the digitized checks to conform said digitized check with at least one predetermined requirement, and for processing the data unrelated to said digitized checks.

2. The device according to claim 1, wherein said at least one predetermined requirement is a requirement set forth by the Check 21 Act.

3. The device according to claim 1, wherein the at least one predetermined requirement is selected from the group consisting of providing a message to each digitized check, providing a MICR line to each digitized check, identifying the reconverting banks for each digitized check.

4. The device according to claim 1, wherein the at least one data capture module is selected from the group consisting of an imaging module, a laser scanning module, and a RFID reading module.

5. The device according to claim 1, further comprising communication circuitry controlled by said processor for receiving and transmitting data including the processed digitized checks.

6. The device according to claim 1, further comprising an actuation mechanism for transmitting at least one signal to said processor for operating said device between a first and a second mode, wherein in the first mode, said processor operates said digitizer and in the second mode, said processor operates said at least one data capture module.

7. The device according to claim 6, wherein said actuation mechanism includes a sensor for determining if a check is positioned within a check-receiving slot of said digitizer.

8. The device according to claim 1, further comprising a magnetic reader, a display, a memory and at least one input device in operative communication with said processor.

9. The device according to claim 1, wherein said device is a point-of-sale terminal.

10. An integrated platform for digitizing checks and decoding optical code data, said device comprising:
    a processor executing application software for operating a digitizer for scanning and digitizing said checks, for operating at least one data capture module for generating data unrelated to said digitized checks, said data unrelated to said digitized checks comprising optical code related data, biometric related data, and RFID tag related data, for processing the digitized checks to conform said digitized checks with at least one predetermined requirement, and for processing the data unrelated to said digitized checks.

11. The integrated platform according to claim 10, wherein said at least one predetermined requirement is a requirement set forth by the Check 21 Act.

12. The integrated platform according to claim 10, wherein the at least one predetermined requirement is selected from the group consisting of providing a message to each digitized check, providing a MICR line to each digitized check, identifying the reconverting banks for each digitized check.

13. The integrated platform according to claim 10, wherein the at least one data capture module is selected from the group consisting of an imaging module, a laser scanning module, and a RFID reading module.

14. The integrated platform according to claim 10, further comprising communication circuitry controlled by said processor for receiving and transmitting data including the processed digitized checks.

15. The integrated platform according to claim 10, further comprising an actuation mechanism for transmitting at least one signal to said processor for operating said device between a first and a second mode, wherein in the first mode, said processor operates said digitizer and in the second mode, said processor operates said at least one data capture module.

16. The integrated platform according to claim 15, wherein said actuation mechanism includes a sensor for determining if a check is positioned within a check-receiving slot of said digitizer.

17. The integrated platform according to claim 10, further comprising a magnetic reader, a display, a memory and at least one input device in operative communication with said processor.

18. A combination document digitizer and optical code data decoding device comprising:
   a document digitizer for digitizing documents;
   a processor for controlling the operation of said document digitizer and at least one data capture module, and for processing data generated by said at least one data capture module and unrelated to said digitized documents, said data unrelated to said digitized documents comprising optical code related data, biometric related data, and RFID tag related data.

19. The device according to claim 18, wherein said processor executes application software for conforming said digitized documents with at least one predetermined requirement.

20. The device according to claim 19, wherein said at least one predetermined requirement is a requirement set forth by the Check 21 Act.

21. The device according to claim 19, wherein said digitized documents are digitized checks, and wherein the at least one predetermined requirement is selected from the group consisting of providing a message to each digitized check, providing a MICR line to each digitized check, identifying the reconverting banks for each digitized check.

22. The device according to claim 18, wherein the at least one data capture module is selected from the group consisting of an imaging module, a laser scanning module, and a RFID reading module.

23. The device according to claim 18, wherein said device is a point-of-sale terminal.

24. A device for digitizing checks and decoding optical code data, said device comprising:
   a digitizer for digitizing said checks;
   at least one data capture module for generating data unrelated to said digitized checks, said at least one data capture module comprising a module for generating optical code data indicative of an optical code, said optical code data being data unrelated to said digitized checks; and
   a processor capable of executing application software for operating said digitizer and said at least one data capture module, for processing the digitized checks to conform said digitized check with at least one predetermined requirement, and for processing the data unrelated to said digitized checks.

25. The device according to claim 24, wherein said at least one predetermined requirement is a requirement set forth by the Check 21 Act.

26. The device according to claim 24, wherein the at least one predetermined requirement is selected from the group consisting of providing a message to each digitized check, providing a MICR line to each digitized check, identifying the reconverting banks for each digitized check.

27. The device according to claim 24, wherein the at least one data capture module is selected from the group consisting of an imaging module, a laser scanning module, and a RFID reading module.

28. The device according to claim 24, further comprising communication circuitry controlled by said processor for receiving and transmitting data including the processed digitized checks.

29. The device according to claim 24, further comprising an actuation mechanism for transmitting at least one signal to said processor for operating said device between a first and a second mode, wherein in the first mode, said processor operates said digitizer and in the second mode, said processor operates said at least one data capture module.

30. The device according to claim 29, wherein said actuation mechanism includes a sensor for determining if a check is positioned within a check-receiving slot of said digitizer.

31. The device according to claim 24, further comprising a magnetic reader, a display, a memory and at least one input device in operative communication with said processor.

32. The device according to claim 24, wherein said device is a point-of-sale terminal.

33. The device according to claim 24, wherein said at least one data capture module further comprising an RFID reading module for generating data after sensing RFID signals transmitted form RFID tags.

34. The device according to claim 24, further comprising at least one biometric sensor in operative communication with the processor.

35. An integrated platform for digitizing checks and decoding optical code data, said device comprising:
   a processor executing application software for operating a digitizer for scanning and digitizing said checks, for operating at least one data capture module for generating data unrelated to said digitized checks, said data unrelated to said digitized checks comprising optical code related data, for processing the digitized checks to conform said digitized checks with at least one predetermined requirement, and for processing the data unrelated to said digitized checks.

36. The integrated platform according to claim 35, wherein said at least one predetermined requirement is a requirement set forth by the Check 21 Act.

37. The integrated platform according to claim 35, wherein the at least one predetermined requirement is selected from the group consisting of providing a message to each digitized check, providing a MICR line to each digitized check, identifying the reconverting banks for each digitized check.

38. The integrated platform according to claim 35, wherein the at least one data capture module is selected from the group consisting of an imaging module, a laser scanning module, and a RFID reading module.

39. The integrated platform according to claim 35, further comprising communication circuitry controlled by said processor for receiving and transmitting data including the processed digitized checks.

40. The integrated platform according to claim 35, further comprising an actuation mechanism for transmitting at least one signal to said processor for operating said device between a first and a second mode, wherein in the first mode, said processor operates said digitizer and in the second mode, said processor operates said at least one data capture module.

41. The integrated platform according to claim 40, wherein said actuation mechanism includes a sensor for determining if a check is positioned within a check-receiving slot of said digitizer.

42. The integrated platform according to claim 35, further comprising a magnetic reader, a display, a memory and at least one input device in operative communication with said processor.

43. The integrated platform according to claim 35, wherein said at least one data capture module comprising at least one of an RFID reading module for generating data after sensing REID signals transmitted form RFID tags, and a module for generating optical code data indicative of an optical code.

44. The integrated platform according to claim 35, further comprising at least one biometric sensor in operative communication with the processor.

* * * * *